(12) United States Patent
Ford

(10) Patent No.: US 8,512,841 B2
(45) Date of Patent: Aug. 20, 2013

(54) CORRUGATED ROOF FILLER

(75) Inventor: Richard H. Ford, Braselton, GA (US)

(73) Assignee: Pak-Lite, Inc., Suwanee, GA (US)

( * ) Notice: Subject to any disclaimer, the term of this patent is extended or adjusted under 35 U.S.C. 154(b) by 205 days.

(21) Appl. No.: 13/048,996

(22) Filed: Mar. 16, 2011

(65) Prior Publication Data

US 2012/0237709 A1 Sep. 20, 2012

(51) Int. Cl.
*B32B 7/12* (2006.01)
*B32B 3/10* (2006.01)
*E04D 13/15* (2006.01)
*E04D 3/366* (2006.01)

(52) U.S. Cl.
USPC ............ 428/40.1; 428/98; 428/131; 428/343; 52/94

(58) Field of Classification Search
USPC ........ 428/40.1, 98, 119, 131, 343; 52/94–96, 52/302.3
See application file for complete search history.

(56) References Cited

U.S. PATENT DOCUMENTS

| 2,853,330 | A | * | 9/1958 | Harry | 277/649 |
| D465,992 | S | | 11/2002 | Sarig | |
| 7,278,246 | B2 | | 10/2007 | Nahmias | |
| 2004/0224114 | A1 | * | 11/2004 | Patel | 428/40.1 |
| 2006/0204725 | A1 | | 9/2006 | Pavlansky et al. | |

\* cited by examiner

*Primary Examiner* — Patricia Nordmeyer
(74) *Attorney, Agent, or Firm* — Bryan W. Bockhop; Bockhop & Associates, LLC

(57) ABSTRACT

A closure strip, for use with a corrugated material, includes an elongated flat thermoplastic sheet member and a plurality of thermoplastic undulations. The elongated flat thermoplastic sheet member has a bottom surface and an opposite top surface. The elongated flat thermoplastic sheet member defines a plurality of linearly disposed and spaced apart openings therethrough. A plurality of thermoplastic undulations is complimentary in shape to the corrugated material. Each undulation extends upwardly from the flat thermoplastic sheet member and defines a void that opens to a different one of the openings defined by the flat thermoplastic sheet member.

8 Claims, 3 Drawing Sheets

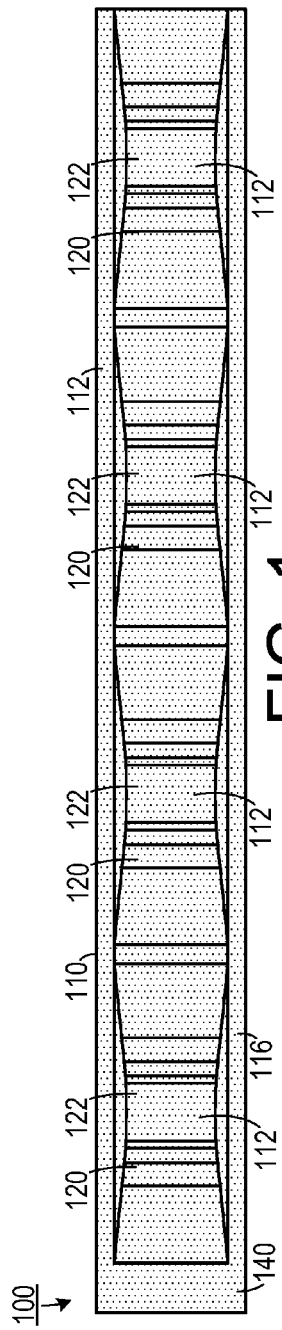
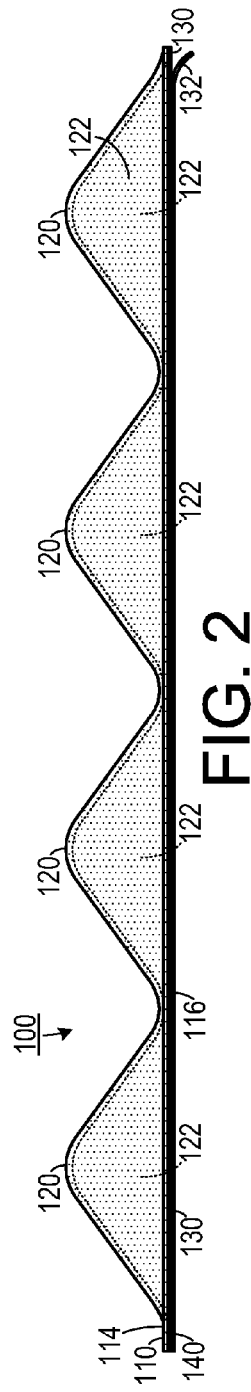
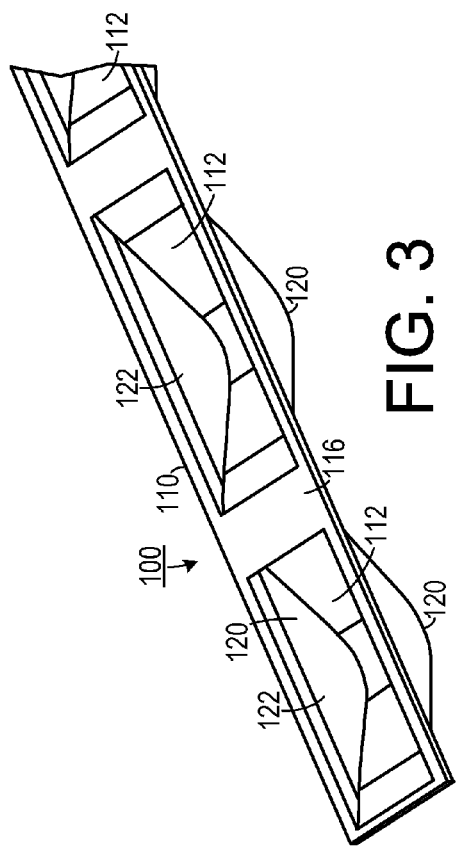

2

CORRUGATED ROOF FILLER

BACKGROUND OF THE INVENTION

1. Field of the Invention

The present invention relates to construction materials and, more specifically, to closure strips employed to fill voids formed by corrugated roofing materials and the like.

2. Description of the Related Art

Corrugated sheets of metal and fiberglass are used in many construction applications, such as roofing. In a roofing application, a corrugated sheet is typically fastened to a roofing structure, such as purlins affixed to roof trusses, so that the troughs in the corrugated sheet run down the slope formed by the trusses, perpendicular to the purlins. The corrugated sheets are first fastened at the eaves and then overlapping sheets are placed on the roof structure up to the ridge of the roof.

Some buildings employ a soffit and fascia to restrict air flow from the outside of the building to the inside. However, in a roof that does not employ plywood decking as a base for the corrugated sheets, air can flow in the spaces defined by the fascia and the corrugations of the corrugated sheets. Also, small birds and insects can enter the building through these spaces.

Undulated closure strips are typically used to fill these spaces so as to restrict air flow and animal access to buildings using corrugated roofing. Typically, when building a roof, the fascia is affixed to the eaves and then a series of closure strips are affixed to the fascia and purlins. The corrugated sheet is then affixed to the roof structure so that the sheets adjacent to the eaves sit on top of the closure strips, with the undulations of the closure strips sealing the spaces between the corrugations and the fascia.

One type of closure strip is made from injection molded plastic, which a rigid undulated fascia that has a shape complimentary to the corrugations in the corrugated sheet. This type of closure strip is typically nailed to the fascia during installation. It has several disadvantages, including a high materials cost and the fact that the closure strips are made of rigid plastic, gaps can form between irregularities in the roofing sheets and the closure strips, thereby allowing air to pass through the gaps. Another type of closure strip is made from foam molded or cut to have solid undulations. Solid foam closure strips conform to the corrugated sheets, but have the disadvantage of wasting materials.

Therefore, there is a need for an inexpensive and lightweight closure strip.

SUMMARY OF THE INVENTION

The disadvantages of the prior art are overcome by the present invention which, in one aspect, is a closure strip for use with a corrugated material, which includes an elongated flat thermoplastic sheet member and a plurality of thermoplastic undulations. The elongated flat thermoplastic sheet member has a bottom surface and an opposite top surface. The elongated flat thermoplastic sheet member defines a plurality of linearly disposed and spaced apart openings therethrough. A plurality of thermoplastic undulations is complimentary in shape to the corrugated material. Each undulation extends upwardly from the flat thermoplastic sheet member and defines a void that opens to a different one of the openings defined by the flat thermoplastic sheet member.

In another aspect, the invention is a device for making a closure strip. An undulated mold has a shape that is complimentary to a desired shape of the closure strip. A thermoforming device is configured to thermoform a thermoplastic sheet on the mold.

In yet another aspect, the invention is a method of making a closure strip for use with a corrugated material, in which an undulated mold is placed on a surface of a thermoforming device. The undulated mold has a shape that is complimentary to a desired shape of the closure strip. The sheet of thermoplastic material is heated until the thermoplastic material is suitable for thermoforming. When the thermoplastic material is suitable for thermoforming, the sheet of thermoplastic material is applied to the undulated mold and a force is applied to the sheet of thermoplastic material so as to cause the sheet of thermoplastic material to acquire the desired shape of the closure strip. The sheet of thermoplastic material is cooled sufficiently so that the sheet of thermoplastic material maintains the desired shape of the closure strip. The sheet is removed from the mold.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE FIGURES OF THE DRAWINGS

FIG. 1 is a top plan view of one embodiment of a closure strip.

FIG. 2 is a side elevational view of the embodiment shown in FIG. 1.

FIG. 3 is a bottom perspective view of the embodiment shown in FIG. 1.

DETAILED DESCRIPTION OF THE INVENTION

Figure 4:
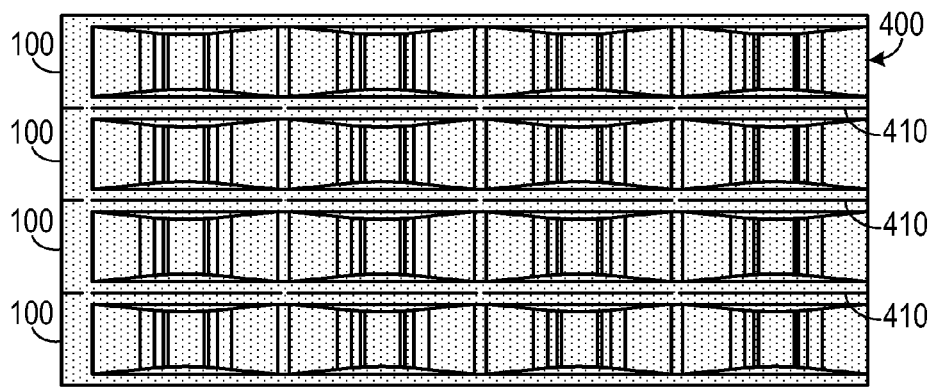
FIG. 4 is a top plan view of a plurality of closure strips.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIGS. 1-3, one embodiment of a closure strip 100 for use with a corrugated material includes an elongated flat sheet member 110 thermoformed from a thermoplastic. The elongated flat sheet member 110 has a bottom surface 116 and an opposite top surface 114. The bottom surface 116 defines a plurality of linearly disposed and spaced apart openings 112 therethrough. A plurality of periodically spaced-apart thermoplastic undulations 120 that are complimentary in shape to the corrugated material extend upwardly from the flat sheet member 110. Each of the undulations 120 defines a void 122 that opens to a different one of the openings 112 defined by the flat thermoplastic sheet member 110. In one embodiment, the sheet member 110 and the plurality of undulations 120 are formed from a common sheet of synthetic foam. Examples of suitable synthetic foams can include polypropylene, polyethylene, cross-linked polyethylene, styrene, and acrylonitrile butadiene styrene. Also, a fire retardant can be added to the thermoplastic used in the closure strip 100.

An adhesive layer 130 (such as a pressure sensitive adhesive) is applied to the bottom surface 116 of the flat thermoplastic sheet member 110 and a peel-off backing 132 covers the adhesive layer 130.

In one embodiment, as shown in FIG. 4, several closure strips 110 can be formed simultaneously from a common sheet member 400. Perforations 410 can be cut between the closure strips 110 to facilitate tearing apart of the closure strips 110 during installation.

Figure 5A:
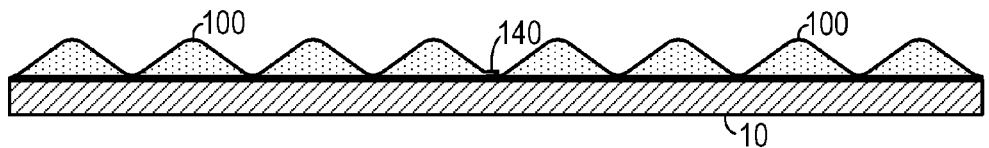
FIGS. 5A-5B are two schematic drawings showing use of the closure strip shown in FIG. 1.
Figure 5B:
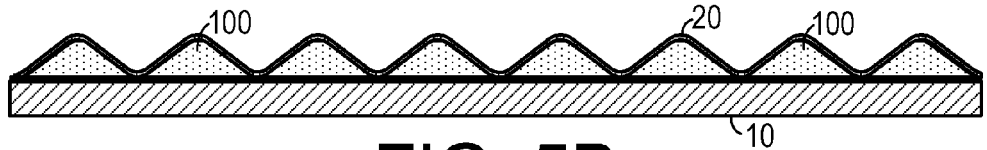
Figure 6:
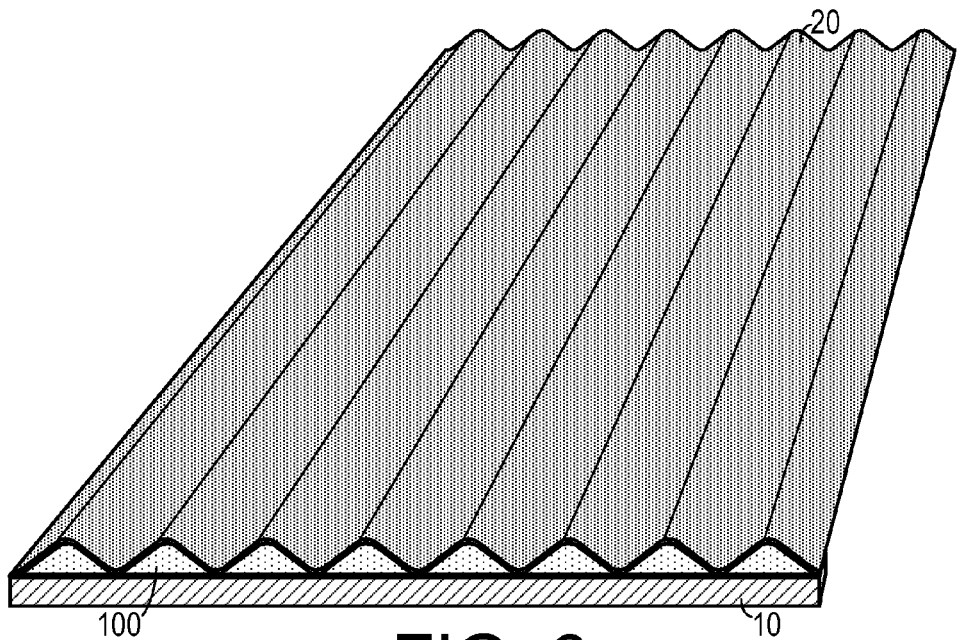
FIG. 6 is a perspective view of a closure strip affixed to a fascia and a corrugated material placed thereon.
Figure 7A:
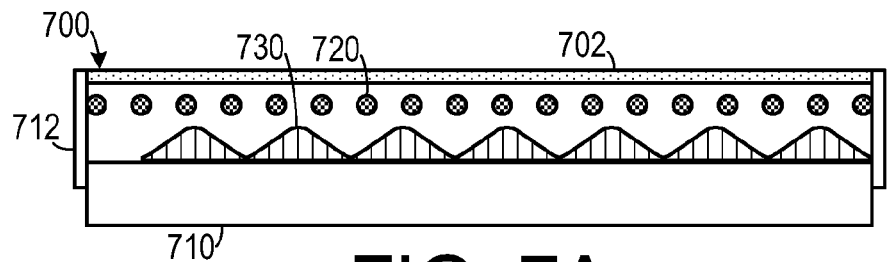
FIGS. 7A-7E are a series of schematic diagrams showing one method of making a closure strip and a device used to execute the method.
Figure 7B:
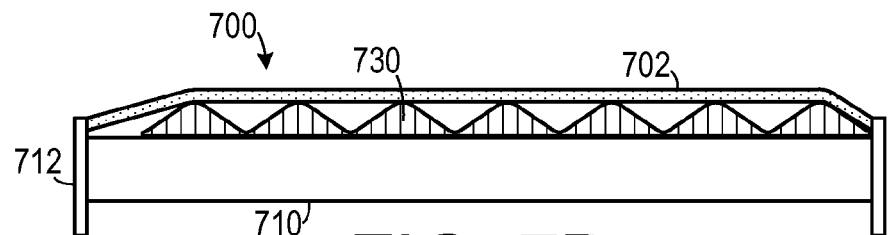
Figure 7C:
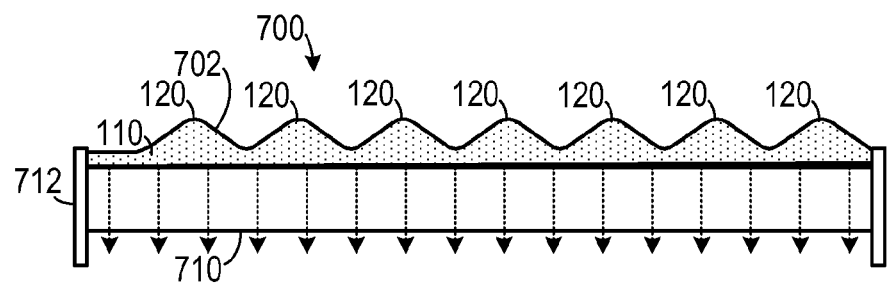
Figure 7D:
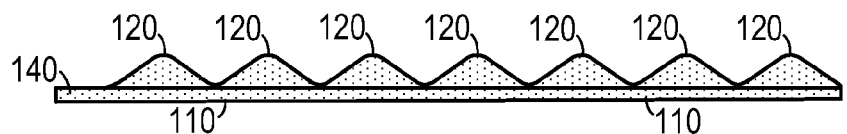
Figure 7E:
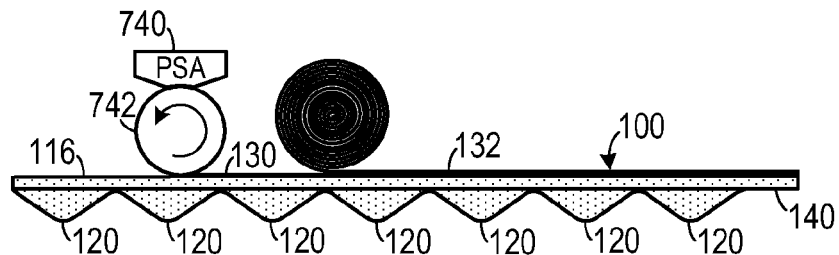

In one embodiment, an overlap tab 140 extends laterally from one side of the thermoplastic sheet member 110 to allow successive closure strips to be installed in a continuous manner. One manner of installing closure strips 100 is shown in FIGS. 5A, 5B and 6. Initially, the peel-off backing 132 is removed from the closure strip 100, thereby exposing the adhesive 130, and the closure strip 100 is applied to a horizontal surface 10 (such as a fascia or a purlin in a roof structure). The corrugated sheet 20 is then placed on the closure strip 100 and the corrugated sheet 20 is then secured to the roofing structure.

The closure strips disclosed above can be made, as shown in FIGS. 7A-7E, by placing an undulated mold 730 having a shape that is complimentary to a desired shape of the closure strip 100 on a thermoforming device 700 (such as on a vacuum table 710 of a vacuum forming device or a pressure forming device). A thermoplastic sheet 702 supported by a moveable frame 712, which can move between a first position away from the mold 730 and a second position adjacent the mold 730 (alternately, the mold 730 can be moved up the thermoplastic sheet 702). The thermoplastic sheet 702 is heated by a heating element 720 until it reaches a temperature where it becomes pliable. Once pliable, the heating element 720 is moved away from the thermoplastic sheet 702 and the thermoplastic sheet 702 is moved down onto the undulated mold 730. Force is then applied to the thermoplastic sheet 702, causing it acquire the shape of the mold 730. The force could be, for example, a vacuum drawn from the space between the thermoplastic sheet 702 and the mold 730 by a vacuum device, or it could result from an increase in air pressure that presses the thermoplastic sheet 702 into the mold. Similarly, a second mold (not shown) complimentary in shape to mold 730 could be used to press the thermoplastic sheet 702 into molt 730.

Once the thermoplastic sheet 730 has acquired the shape of the mold 730, it is cooled until it is capable of maintaining the shape of the closure trip and then it is removed from the mold 730. A layer 130 of a pressure sensitive adhesive 740 is applied (for example, with a roller 742) to the bottom side 116 of the sheet of thermoplastic material 110. The peel-off backing 132 is then applied to the pressure sensitive adhesive layer 130. The resulting closure strips 100 can then be trimmed to their final shape The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A closure strip for use with a corrugated material, comprising:
    a. an elongated flat thermoplastic sheet member, having a bottom surface and an opposite top surface, that defines a plurality of linearly disposed and spaced apart openings therethrough; and
    b. a plurality of thermoplastic undulations that are thermoformed into the flat thermoplastic sheet member and that are complimentary in shape to the corrugated material, the plurality of thermoplastic undulations being integral with the flat thermoplastic sheet member and each undulation being continuously covered by thermoplastic, each undulation extending upwardly from the flat thermoplastic sheet member and defining a void that opens to a different one of the openings defined by the flat thermoplastic sheet member so that each undulation opens only along the bottom surface of the flat thermoplastic sheet member underneath the undulation.

2. The closure strip of claim 1, further comprising an adhesive applied to the bottom surface of the flat thermoplastic sheet member.

3. The closure strip of claim 2, wherein the adhesive comprises a pressure sensitive adhesive.

4. The closure strip of claim 3, further comprising a peel-off backing disposed so as to cover the pressure sensitive adhesive.

5. The closure strip of claim 1, wherein the sheet member and the plurality of undulations comprise a synthetic foam.

6. The closure strip of claim 5, wherein the foam comprises a thermoplastic selected from a group consisting of: polypropylene, polyethylene, cross-linked polyethylene, styrene, acrylonitrile butadiene styrene, and combinations thereof.

7. The closure strip of claim 1, wherein the thermoplastic sheet member comprises a fire retardant.

8. The closure strip of claim 1, further comprising an overlap tab extending laterally from the elongated flat thermoplastic sheet member.

* * * * *